(12) United States Patent
Ozyilmaz et al.

(10) Patent No.: US 9,797,779 B2
(45) Date of Patent: Oct. 24, 2017

(54) PYROELECTRIC DETECTOR USING GRAPHENE ELECTRODE

(71) Applicant: National University of Singapore, Singapore (SG)

(72) Inventors: Barbaros Ozyilmaz, Singapore (SG); Eeshan Sandeep Kulkarni, Singapore (SG); Sascha Pierre Heussler, Singapore (SG); Antonio Helio Castro Neto, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 15/101,196

(22) PCT Filed: Dec. 5, 2014

(86) PCT No.: PCT/SG2014/000579
§ 371 (c)(1),
(2) Date: Jun. 2, 2016

(87) PCT Pub. No.: WO2015/084267
PCT Pub. Date: Jun. 11, 2015

(65) Prior Publication Data
US 2016/0305824 A1  Oct. 20, 2016

Related U.S. Application Data

(60) Provisional application No. 61/912,179, filed on Dec. 5, 2013.

(51) Int. Cl.
*G01J 5/34* (2006.01)
*G01J 5/04* (2006.01)

(52) U.S. Cl.
CPC .................. *G01J 5/34* (2013.01); *G01J 5/046* (2013.01)

(58) Field of Classification Search
CPC ........ G01J 5/02; G01J 5/10; G01J 5/34; G01J 5/046; H01L 37/02
See application file for complete search history.

(56) References Cited

U.S. PATENT DOCUMENTS

| 4,682,030 A | 7/1987 | Rose et al. |
| 4,792,682 A | 12/1988 | Endou et al. |

(Continued)

FOREIGN PATENT DOCUMENTS

| WO | WO 2015/084267 A1 | 6/2015 |
| WO | WO 2016/007089 A1 | 1/2016 |

OTHER PUBLICATIONS

Bae, S.H., et al., "Graphene-P(VDF-TrFE) multilayer film for flexible applications", *ACS Nano*, 2013, 7(4): 3130-3038.

(Continued)

*Primary Examiner* — David Porta
*Assistant Examiner* — Faye Boosalis
(74) *Attorney, Agent, or Firm* — Hamilton, Brook, Smith & Reynolds, P.C.

(57) ABSTRACT

Graphene and ferroelectric materials are used as tunable sensors for detecting and measuring radiation, such as infrared radiation. The low absorption and reflectance of graphene and interconnected graphene networks, for example in the infrared, are exploited for use in such tunable sensors. The active layer makes use of a unique property of ferroelectric materials, known as the pyroelectric effect, for measuring the intensity of impinging radiation. Using graphene electrodes may offer a significant increase in sensitivity, tunability and mechanical flexibility of sensors, such as infrared sensors. In one method, intensity of radiation is measured using variations in the doping level of the graphene electrode.

20 Claims, 10 Drawing Sheets

(56) References Cited

U.S. PATENT DOCUMENTS

| | | | |
|---|---|---|---|
| 5,108,576 | A | 4/1992 | Malmros et al. |
| 5,695,091 | A | 12/1997 | Winings et al. |
| 6,495,828 | B1 | 12/2002 | Tidrow et al. |
| 2009/0072143 | A1 | 3/2009 | Ishida et al. |
| 2011/0050643 | A1 | 3/2011 | Zhao et al. |
| 2012/0080086 | A1 | 4/2012 | Yoon et al. |
| 2016/0161340 | A1* | 6/2016 | Colli .............. G01J 5/0837 250/338.3 |
| 2017/0139495 | A1 | 5/2017 | Özyilmaz et al. |

OTHER PUBLICATIONS

International Search Report and Written Opinion for Int'l Application No. PCT/SG2015/050201, titled: Human-Machine Interface With Graphene-Pyroelectric Materials, dated Aug. 20, 2015.

Jo, G., et al., The application of graphene as electrodes in electrodes and optical devices, *Nanotechnology*, 2012, 23: 112001, 20 pgs.

Notification Concerning Transmittal of International Preliminary Report on Patentability for Int'l Application No. PCT/SG2014/000579, titled: Pyroelectric Detector Using Graphene Electrode, dated Jun. 7, 2016.

Wei, C.S., et al., "Partial-electroded ZnO pyroelectric sensors for responsivity improvement", *Sensors and Actuators A: Physical*, 2006, 128(1): 18-24.

Wojtczuk, P., et al., "Recognition of Simple Gestures Using a Sensor Array", *Sensors and Transducers*, 2012, vol. 14-1: pp. 83-94.

"Answers to Questions on MCT's Advantages as an Infrared Imaging Material", DRS Technologies. 2010.

"Technology Overview Microbolometer Detectors: Microbolometer focal plane arrays", <http://www.electrophysics.com/View/Viw_TechPrimer_UncooledTutorial.asp>.

Bae, S., et al., "Roll-to-roll production of 30-inch graphene films for transparent electrodes", *Nat Nano*, 2010. 5(8): p. 574-578.

Balcerak, R., et al., "Mercury cadmium telluride material requirements for infrared systems", J. Vac. Sci. Technol. B. 10, 1353-1358 (1992); doi: 10.1116/1.585868.

Barone, P.W., et al., "Near-infrared optical sensors based on single-walled carbon nanotubes", *Nat Mater*, 2005. 4(1): p. 86-92.

Bravina, S.L., et al., "Thermal Characterization of Absorbing Coatings for Thermal Detectors of Radiation by Photopyroelectric Method", eprint arXiv:cond-mat/0603529, 2006. 3529.

de Goeij B., et al. "Microbolometer Spectrometer MIBS: Smaller and smarter", 5th ESA Round Table on Micro/Nano Technologies for Space, Oct. 3-5, 2005.

Deming, D., et al., "Infrared radiation from an extrasolar planet", *Nature*, 2005. 434(7034): p. 740-743.

Dong Hoon, C., et al., Pyroelectric Properties of the B-Polyvilnylidene Flouride (PVDF) Thin Film Prepared by Vacuum Deposition with Electric Field Application. Japanese Journal of Applied Physics, 2002. 41, Part 1, No. 11B, pp. 7234-7238.

Emmerich, R., et al., "Pyroelectric effects in PVDF and P(VDF-TrFE)", in Electrets, 1991. (ISE 7) Proceedings., 7th International Symposium on (Cat. No. 91CH3029-6). 1991.

Fujitsuka, N., et al., "Monolithic pyroelectric infrared image sensor using PVDF thin film. in Solid State Sensors and Actuators", 1997. Transducers '97 Chicago., 1997 International Conference on. 1997.

Granqvist, C.G., et al., "Transparent and conducting ITO films: new developments and applications", *Thin Solid Films*, 2002. 411(1): p. 1-5.

Han, Q., et al., "Highly sensitive hot electron bolometer based on disordered graphene", Sci. Rep., 2013. 3.

Hsiao, C.-C., et al., "Electrode layout of ZnO pyroelectric sensors", *Journal of Mechanical Science and Technology*, 2011. 25(11): p. 2835-2842.

Hu, L., et al., "Infrared transparent carbon nanotube thin films", *Applied Physics Letters*, 2009. 94(8): p. 081103-081103-3.

Hur, S-G, et al. "NiCr Alloy as both Absorption layer and top electrode onto Pb(Zr0.3Ti0.7)O3 thin films for Infrared Sensors", Integrated Ferroelectrics: An International Journal, 54:1, 741-746, 2003. DOI: 10.1080/714040724.

International Search Report and Written Opinion for Int'l Application No. PCT/SG2014/000579, titled: Pyroelectric Detector Using Graphene Electrode, dated Mar. 17, 2015.

Kallhammer, J.-E., "Imaging: The road ahead for car night-vision", *Nat Photon*, 2006. sample(sample): p. 12-13.

Kulkarni, E.S., et al., "Exploiting the IR-Transparency of Graphene for Fast Pyroelectric Infrared Detection", *Advanced Optical Materials*.

Kwon, S.Y., "Effect of P(VDF/TrFE) Film Thickness on the Characteristics of Pyroelectric Passive Infrared Ray Sensor for Human Body Detection", *Journal of Sensor Science and Technology*, 2011. 20(2): p. 3.

Lee, J.-H., et al., "Highly Stretchable Piezoelectric-Pyroelectric Hybrid Nanogenerator", *Advanced Materials*, 2014. 26(5): p. 765-769.

Levesque, M., et al., "P(VDF-TrFE) infrared detectors and array", 1994.

Li, X., et al., "Large-Area Synthesis of High-Quality and Uniform Graphene Films on Copper Foils", *Science*, 2009. 324(5932): p. 1312-1314.

Li, Z.Q., et al., "Dirac charge dynamics in graphene by infrared spectroscopy", *Nat Phys*, 2008. 4(7): p. 532-535.

Liu, C.-H., et al., "Graphene photodetectors with ultra-broadband and high responsivity at room temperature", *Nat Nano*, 2014. advance online publication.

Low, T., et al., "Graphene Plasmonics for Terahertz to Mid-Infrared Applications", *ACS Nano*, 2014. 8(2): p. 1086-1101.

Nair, R.R., et al., "Fine Structure Constant Defines Visual Transparency of Graphene", *Science*, 2008. 320(5881): p. 1308.

Ni, G.-X., et al., "Graphene-Ferroelectric Hybrid Structure for Flexible Transparent Electrodes", *ACS Nano*, 2012. 6(5): p. 3935-3942.

Notification Concerning Transmittal of International Preliminary Report on Patentability for Int'l Application No. PCT/SG2014/000579, titled: Pyroelectric Detector Using Graphene Electrode, dated Jun. 16, 2016.

Rogalski, A., "Infrared detectors: an overview", *Infrared Physics & Technology*, 2002. 43(3-5): p. 187-210.

Setiadi, D., et al., "A 3×1 integrated pyroelectric sensor based on VDF/TrFE copolymer", *Sensors and Actuators A: Physical*, 1996. 52(1-3): p. 103-109.

Setiadi, D., et al., "A pyroelectric polymer infrared sensor array with a charge amplifier readout", *Sensors and Actuators A: Physical*, 1999. 76(1-3): p. 145-151.

Takayama, R., et al., "Preparation and characteristics of pyroelectric infrared sensors made of c-axis oriented La-modified PbTiO3 thin films", *Journal of Applied Physics*, 1987. 61(1): p. 411-415.

Tassin, P., et al., "Graphene for Terahertz Applications", Science, 2013. 341(6146): p. 620-621.

Tonouchi, M., "Cutting-edge terahertz technology", *Nat Photon*, 2007. 1(2): p. 97-105.

Vicarelli, L., et al., "Graphene field-effect transistors as room-temperature terahertz detectors" *Nat Mater*, 2012. 11(10): p. 865-871.

Whatmore, R.W., "Pyroelectric ceramics and devices for thermal infra-red detection and imaging", *Ferroelectrics*, 1991. 118(1): p. 241-259.

Wu, Z., et al., "Transparent, Conductive Carbon Nanotube Films", *Science*, 2004. 305(5688): p. 1273-1276.

Yan, J., et al., "Dual-gated bilayer graphene hot-electron bolometer. Nat Nano", 2012. 7(7): p. 472-478.

Notification Concerning Transmittal of International Preliminary Report on Patentability for Int'l Application No. PCT/SG2015/050201, entitled: "Human-Machine Interface With Graphene-Pyroelectric Materials", dated Aug. 20, 2015.

Yang, J., et al., "Real-time, continuous-wave terahertz imaging by a pyroelectric camera", *Chinese Optics Letters*, 2008, 6(1): 29-31.

\* cited by examiner

PYROELECTRIC DETECTOR USING GRAPHENE ELECTRODE

RELATED APPLICATION

This application is the U.S. National Stage of International Application No. PCT/SG2014/000579, filed on Dec. 5, 2014, which designates the U.S., published in English, and claims the benefit of U.S. Provisional Application No. 61/912,179, filed on Dec. 5, 2013, the entire teachings of which applications are incorporated herein by reference.

BACKGROUND OF THE INVENTION

Infrared (IR) sensors rely on the inherent response of certain materials for capturing variations in the infrared component of an incoming light source. Infrared sensors are an essential component in a number of sensing applications in the industrial and research sectors, including, but not necessarily limited to, defense, quality control and inspection, surveillance, biomedical imaging, as well as research and development.

There are several drawbacks associated with the materials and technology used within modern infrared sensors, which result in degraded performance metrics, such as response time, sensitivity and others, as well as high costs. High resolution Mercury Cadmium Telluride (MCT) IR detectors, for instance, which rely on the photoconductive response of certain materials, are required to operate at temperatures approaching ~70 K, preventing them from being widely used. Microbolometers, which can operate at room temperature, suffer from lower resolution (1) (i.e., Noise Equivalent Temperature Differential, NETD) as compared to photoconductive detectors, due to effects such as thermal cross-talk at room temperature.

Pyroelectric IR sensors that utilize IR-reflective top electrodes have lower sensitivity compared to both MCT and Microbolometers, due to the reflectivity of the top electrode, which is often patterned in order to maximize IR transmission to the active layer (2). The patterned, generally metallic, electrodes that are used in existing pyroelectric IR sensors either reflect or absorb IR, which limits the sensitivity, tunability and flexibility of the device. Patterning causes a trade-off between electrode coverage across the active area, which affects the magnitude of the output signal, and active area exposure, which affects the number of IR photons absorbed by the detector. Pyroelectric IR sensors that utilize Nichrome and other IR absorbing electrodes, limit the wavelengths that the detector can sense due to the well-defined absorption characteristics of the electrode. Furthermore, all IR sensors currently available are also restricted in terms of flexibility and thus must remain attached to static and planar monitoring equipment. The rigidity of current IR sensors leads to a requirement for complex optical components in order to correct for optical aberrations.

Commercially available IR sensors make use of either bolometric, photoconductive or pyroelectric properties of the active layer. These sensors typically comprise the active layer, an optional IR absorbing layer (in cases where the active layer has poor IR absorbance), a set of electrodes as well as a substrate. A brief discussion of the operation and drawbacks of existing technology follows.

Bolometric IR detectors, or microbolometers, make use of the temperature response of certain materials. That is, materials that exhibit a change in electrical resistance as a result of the temperature change due to the absorption of radiation. Microbolometers have two drawbacks; the first, is that in order to measure a change in resistance, a constant bias current needs to be passed through the device when it is in operation (2). Secondly, the accuracy of microbolometers is often degraded due to thermal crosstalk, which occurs due to thermal coupling between adjacent pixels. Thermal crosstalk occurs when the heat generated on one pixel due to impinging radiation, is conducted to an adjacent pixel through either the conducting electrodes or the substrate. In such cases, a resistance change observed at a given pixel may not be due to radiation impinging on that particular pixel, but rather due to heat transfer from an adjacent pixel leading to false detections.

Photoconductive IR sensors represent a class of high sensitivity sensors that are expensive and typically operate at low temperatures (~70 K). Materials used within such sensors include Mercury Cadmium Telluride (MCT), Mercury Zinc Telluride (MZT) and others, many of which are difficult to grow in a controlled manner (3). Other limitations, such as low operating temperatures (in order to negate the effects of thermal noise), as well as the need for a constant bias current, prevent such devices from being used in applications other than military and research and development (4).

Pyroelectric sensors are a class of IR detectors that make use of the pyroelectric effect, which describes the spontaneous polarization/depolarization observed within the dipoles of certain materials as a result of a time-varying temperature change. Existing pyroelectric IR sensors consist of a top and bottom electrode, as well as an active pyroelectric layer. The top electrode typically consists of a patterned layer of conducting material such as gold or Indium Tin Oxide (ITO). Patterning is necessary due to the high infrared reflectivity of the metallic top contact, which causes much of the impinging infrared radiation to reflect away, rather than being absorbed by the IR absorbing layer (5). Having such a reflective top electrode is one of the primary drawbacks of existing pyroelectric sensors as it reduces the effective flux of incoming light and in turn lowers the sensitivity and responsivity of existing sensors. Some pyroelectric IR sensors may also use a top electrode consisting of an IR-absorbing material such as NiCr alloys (6). In these cases, the device is only responsive across the wavelengths of light that are absorbed by the NiCr, due to its predefined absorption spectrum.

There is therefore an ongoing need for improvements in infrared detectors. In addition, there is an ongoing need for improved detectors for other wavelengths of electromagnetic radiation.

SUMMARY OF THE INVENTION

A version of the invention uses graphene and ferroelectric materials as tunable sensors for detecting and measuring radiation, such as infrared radiation. The low absorption and reflectance of graphene and interconnected graphene networks, for example in the infrared, are exploited for use in such tunable sensors. The active layer makes use of a unique property of ferroelectric materials, known as the pyroelectric effect, for measuring the intensity of impinging radiation. Using graphene electrodes may offer a significant increase in sensitivity, tunability and mechanical flexibility of sensors, such as infrared sensors. A method according to one version of the invention measures the intensity of radiation using variations in the doping level of the graphene electrode.

In one version of the invention, there is provided a pyroelectric detector configured to measure intensity of at least one component of electromagnetic radiation impinging on the pyroelectric detector, the at least one component having at least one wavelength. The detector comprises at least one pyroelectric active layer configured to undergo a reorientation of dipoles in response to the at least one component of the electromagnetic radiation; and at least one graphene electrode.

In further, related versions, the pyroelectric detector may further comprise at least one back substrate; and may further comprise at least one of: (i) a substrate transparent to the at least one wavelength of the at least one component of the electromagnetic radiation and (ii) an absorbing layer that is absorbing of the at least one wavelength of the at least one component of the electromagnetic radiation. The at least one back substrate may comprise a transparent and flexible material, for example polyethylene terephthalate. The pyroelectric detector may further comprise a conductive coating on the at least one back substrate, such as a conductive coating transparent to the at least one wavelength of the at least one component of the electromagnetic radiation, or a conductive coating that is reflective of the at least one wavelength of the at least one component of the electromagnetic radiation. The at least one graphene electrode may comprise at least one of: single layer graphene, bilayer graphene, multilayer graphene, reduced graphene oxide, graphene platelets, and an interconnected graphene network. An interconnected graphene network may comprise at least one of: (i) a graphene foam and (ii) a graphene array. The at least one pyroelectric layer may comprise at least one of: (i) polyvinylidene fluoride and (ii) a copolymer of polyvinylidene fluoride; and/or may comprise lead zirconium titanate.

In another related version, the detector may comprise: a substrate transparent to the at least one wavelength of the at least one component of the electromagnetic radiation, the substrate configured to receive the electromagnetic radiation; an absorbing layer that is absorbing of the at least one wavelength of the at least one component of the electromagnetic radiation; a first graphene electrode on a first side of the at least one pyroelectric active layer; a second graphene electrode on a second side of the at least one pyroelectric active layer; and at least one back substrate.

In a further related version, the at least one graphene electrode may comprise a graphene foam, and the at least one pyroelectric active layer may comprise a surrounding coating on at least a portion of the graphene foam, and an outer conducting layer may surround the at least a portion of the at least one pyroelectric active layer.

In other related versions, the at least one graphene electrode may be configured to undergo a change in sheet resistance in response to the at least one component of the electromagnetic radiation. The pyroelectric detector may further comprise a voltage source configured to pass a current across a surface of the at least one graphene electrode; and a voltage probe configured to measure a voltage across the surface of the at least one graphene electrode, the voltage across the surface being proportional to the changed sheet resistance of the at least one graphene electrode. The pyroelectric detector may comprise only one electrode. The detector may comprise a substrate transparent to the at least one wavelength of the at least one component of the electromagnetic radiation, the substrate configured to receive the electromagnetic radiation, and at least one back substrate.

In further, related versions, the detector may be mechanically flexible. The detector may comprise an array that includes a plurality of pyroelectric detectors as taught herein, assembled on a common support substrate.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A and 1B are schematic diagrams of a device structure of a pyroelectric sensor utilizing graphene and pyroelectric components and an optional absorbing layer, in accordance with a version of the invention, in which FIG. 1A is a three-dimensional schematic diagram and FIG. 1B is a cross-sectional schematic diagram.

FIGS. 2A and 2B are schematic diagrams of a device structure of a pyroelectric sensor utilizing an interconnected graphene network and pyroelectric components, in accordance with a version of the invention, in which. FIG. 2A is a three-dimensional schematic diagram and FIG. 2B is a cross-sectional schematic diagram.

FIGS. 3A and 3B are schematic diagrams of a device structure of a pyroelectric sensor utilizing graphene and pyroelectric components, operating in sheet resistance measurement mode, in accordance with a version of the invention, in which FIG. 3A is a three-dimensional schematic diagram and FIG. 3B is a cross-sectional schematic diagram.

FIGS. 4A and 4B are schematic diagrams illustrating operation of a generic graphene/pyroelectric sensor, in accordance with a version of the invention, in which FIG. 4A illustrates operation with no radiation and FIG. 4B illustrates operation with incoming radiation.

FIGS. 5A and 5B are schematic diagrams illustrating operation of a graphene/pyroelectric sensor functioning in sheet resistance mode, in accordance with a version of the invention, in which FIG. 5A illustrates operation with no radiation and FIG. 5B illustrates operation with incoming radiation.

FIG. 9A shows the chopper closed, no incident radiation. FIG. 9B1 shows the chopper open, radiation strikes the absorbing layer, with a portion of heat convectively dissipated to environment. FIG. 9B2 shows conduction of heat from absorbing layer to pyroelectric, illustrating heat lost due to the thermal resistance of the interface and to electrical circuitry. Pyroelectric material eventually undergoes temperature change, and positive current signal observed. FIG. 9C shows the chopper closed. Pyroelectric material cools, and negative current signal observed. FIG. 9D shows chopper closed, no incident radiation. FIG. 9E shows chopper open, radiation is immediately absorbed by pyroelectric layer, which undergoes temperature change. Strong positive current signal observed. FIG. 9F shows chopper closed. Pyroelectric material cools. Negative current signal observed.

DETAILED DESCRIPTION OF THE INVENTION

Figure 1A:
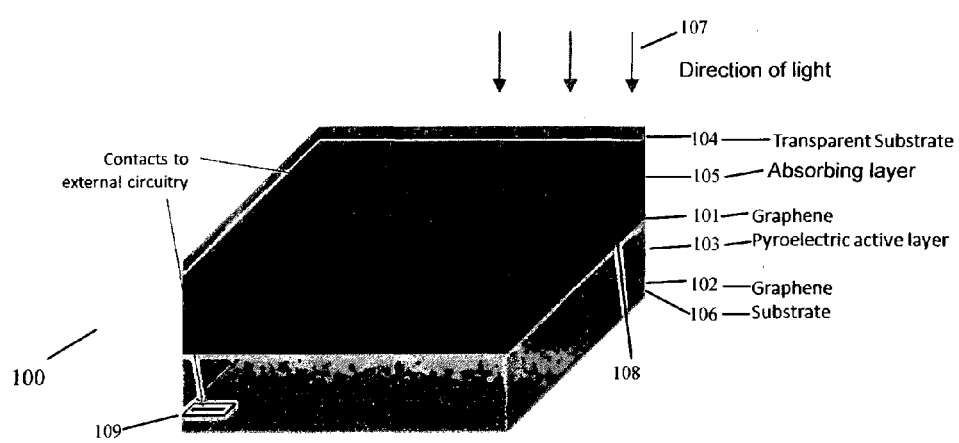

A description of example embodiments of the invention follows.

A version of the invention uses low absorbing, low reflecting graphene electrodes along with flexible pyroelectric materials for the development of tunable and flexible pyroelectric infrared sensors.

In accordance with a version of the invention, the top electrode of a pyroelectric sensor (such as an infrared sensor) is made using low absorbing, low reflecting graphene. By virtue of being both low-reflective and low-absorbing, having a low optical absorption across the entire spectrum (including but not limited to the infrared), graphene enables a device in accordance with a version of the invention to tune which wavelengths of light are detected, which can be achieved by selecting appropriate materials for the pyroelectric and (optional) absorbing layers. The ability to tune which wavelengths are absorbed enables the limiting of the spectral flux reaching the detector, allowing the fabrication of spectrally selective, band-limited (wide or narrow band) detection devices. Such devices open up a wide range of applications for low-cost selective sensors. The device may be capable of achieving higher sensitivities and faster response times than those available at the moment. The flexibility of graphene also permits a device to operate flexibly so long as the device is manufactured on a non-rigid substrate. The nonreactive, impermeable and hydrophobic properties of graphene allow it to remain impervious from harmful environmental effects, further improving the durability and performance of the device.

In accordance with a version of the invention, pyroelectric materials may also be used that lower the sheet resistance of graphene. Such materials may be used in a method of measuring radiation, such as infrared radiation, in which the intensity of radiation is detected by measuring changes in the sheet resistance of the graphene sheet. Note that this is different from bolometric IR detection, as this method makes use of changes in the doping level of the graphene sheet due to variations in the polarization of the pyroelectric layer.

The terms "sensor" and "detector" as they are used in context herein, refer to a device capable of measuring the intensity of at least one component of impinging electromagnetic radiation. For example, detectors taught herein may be used for any electromagnetic radiation, including, but not limited to, infrared radiation, teraherz radiation (far infrared), microwaves, millimeter waves, and other wavelengths of electromagnetic radiation. The ability to measure the intensity of given components of the radiation stems from the absorption characteristics of the active materials discussed, as well as the pyroelectric properties of the ferroelectric layer.

"Pyroelectric sensors" or "pyroelectric detectors," as used herein, refer to a class of detectors that make use of the "pyroelectric" effect, which terms, as used herein, relate to the spontaneous polarization/depolarization observed within the dipoles of certain materials as a result of a time-varying temperature change. The term "time-varying" as it is used herein refers to changes in the bulk temperature of a material over a period of time. Such pyroelectric sensors or pyroelectric detectors may, for example, be used for any electromagnetic radiation, including, but not limited to, infrared radiation, teraherz radiation (far infrared), microwaves, millimeter waves, and other wavelengths of electromagnetic radiation, where the electromagnetic radiation can generate heat in the pyroelectric material. As all ferroelectric materials exhibit the pyroelectric effect, the terms "ferroelectric" and "pyroelectric" may be used interchangeably herein, as can be appreciated from the context.

As used herein, the term "graphene" is used to refer to: single layer graphene (SLG), bilayer graphene (BLG), multilayer graphene (MLG), reduced graphene oxide (RGO) and graphene platelets, as well as interconnected graphene based networks such as foams and arrays.

Figure 1B:
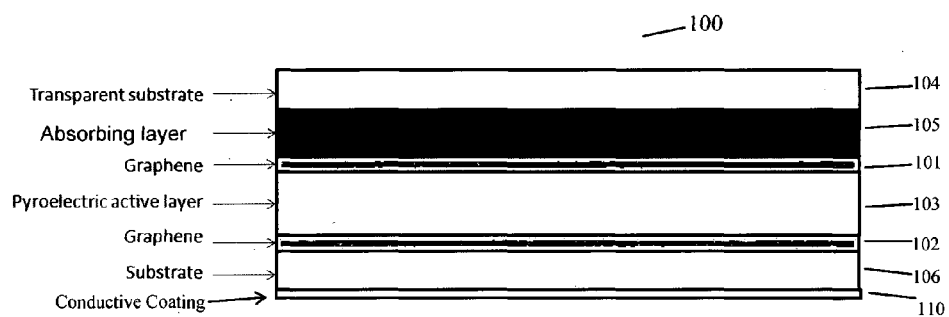

FIGS. 1A and 1B are schematic diagrams of a device structure of a pyroelectric sensor utilizing graphene and pyroelectric components and an optional absorbing layer, in accordance with a version of the invention, in which FIG. 1A is a three-dimensional schematic diagram and FIG. 1B is a cross-sectional schematic diagram. The device 100 includes at least one graphene electrode, here shown as a first graphene electrode 101 and a second graphene electrode 102; and a pyroelectric active layer 103. The device 100 also includes a substrate 104 that is transparent to the wavelength of at least one component of the incident electromagnetic radiation (for example, an IR transparent substrate), an optional absorbing layer 105 that is absorbing of the wavelength of the at least one component of the electromagnetic radiation (for example, an IR absorbing layer), and a back substrate 106. The optional absorbing layer 105 may or may not replace the transparent substrate 104. As can be seen in FIG. 1A, the direction of incident electromagnetic radiation is indicated by the direction of light 107. Contacts to external circuitry are shown at 108 and 109 in the first graphene electrode 101 and second graphene electrode 102, respectively.

In accordance with a version of the invention, for example as shown in FIGS. 1A and 1B, the pyroelectric active layer 103 may be constructed of an organic material such as polyvinylidene fluoride (PVDF) and copolymers thereof, e.g., polyvinylidene fluoride-co-trifluoroethylene (PVDF-TrFE), or inorganic materials such as lead zirconium titanate (PZT). An additional absorbing layer 105 may be used to tune the spectral response of the device; the pyroelectric active layer 103 may serve as the absorbing layer as well, depending on the absorption characteristics of the pyroelectric material. The absorbing layer 105 may also serve as the substrate facing towards the incident radiation 107 in cases where the pyroelectric active layer 103 is not the absorbing layer. Otherwise, the transparent substrate 104 may consist of a flexible or rigid material that is transparent in the spectral region that is to be detected. The back, or bottom, substrate 106 may be constructed of a transparent and flexible material, such as polyethylene terephthalate (PET), or transparent and rigid such as glass. The back substrate 106 is coated with a conductive coating 110 (shown in FIG. 1B only), made either out of a conductor that is transparent in the spectral region that is to be detected (for example, an IR transparent conductor), such as graphene, or a coating that is reflective in the spectral region that is to be detected (for example, an IR reflective coating) such as metallic nanowires or a thin layer of metal (e.g., gold), may be deposited. Where a reflective coating is used, secondary absorption of the radiation is realized, by allowing radiation not initially absorbed on the first pass to be reflected back towards the absorbing and pyroelectric layers.

Figure 2A:
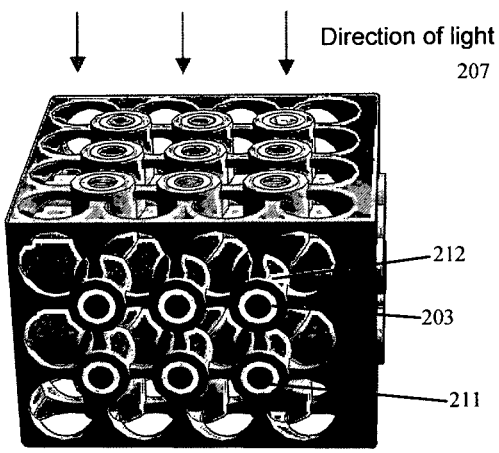
Figure 2B:
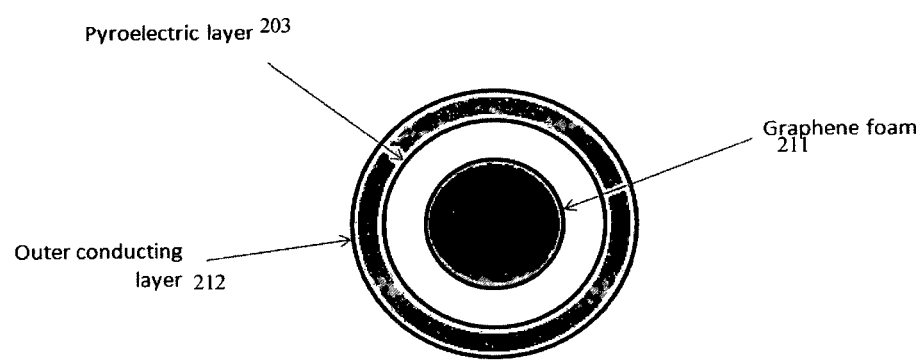

FIGS. 2A and 2B are schematic diagrams of a device structure of a pyroelectric sensor utilizing an interconnected graphene network and pyroelectric components, in accordance with a version of the invention, in which FIG. 2A is a three-dimensional schematic diagram and FIG. 2B is a cross-sectional schematic diagram. The device includes an interconnected graphene network 211, which serves as a graphene electrode. The interconnected graphene network 211 may, for example, be graphene foam or a graphene array. The device also includes a pyroelectric active layer 203, and an outer conducting layer 212. The direction of incident electromagnetic radiation is indicated by the direction of light 207.

Figure 3A:
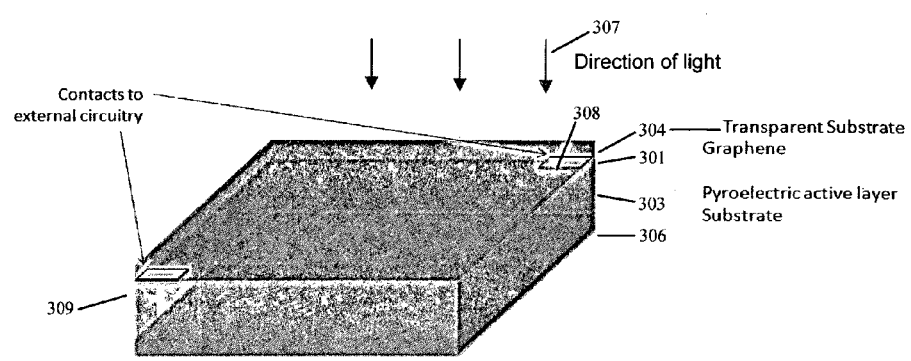
Figure 3B:
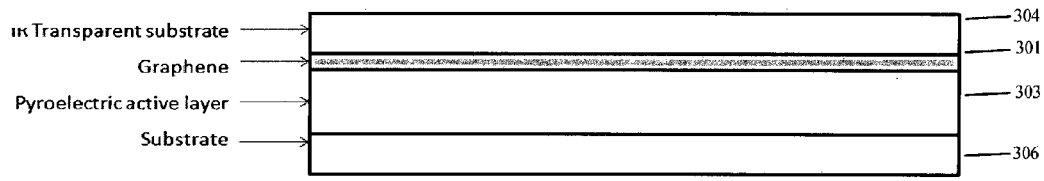

FIGS. 3A and 3B are schematic diagrams of a device structure of a pyroelectric sensor utilizing graphene and pyroelectric components, operating in sheet resistance measurement mode, in accordance with a version of the invention, in which FIG. 3A is a three-dimensional schematic diagram and FIG. 3B is a cross-sectional schematic diagram. The device includes a substrate 304 that is transparent in the spectral region that is to be detected (for example, an IR transparent substrate), a graphene electrode 301, a pyroelectric active layer 303, and optionally, a back substrate 306. Contacts 308, 309 to external circuitry are formed on either side of the graphene electrode 301, in order to enable measurement of sheet resistance as described further below. The direction of incident electromagnetic radiation is indicated by the direction of light 307. In the version of FIGS. 3A and 3B, an optional absorbing layer is not shown, but may be included if required.

In accordance with a version of the invention, the device may be placed perpendicular to the direction of incoming light 107/207/307 so as to maximize the amount of radiation impinging upon the pyroelectric 103/203/303 and/or absorbing layer or layers 105. The benefit of using a graphene foam structure, as in the version of FIGS. 2A and 2B, is that there is a higher surface area for light to interact with the pyroelectric material 203, due to the porosity of the foam, and higher sensitivities may hence be achieved.

Without wishing to be bound by theory, an illustration of the theory of operation of a device in accordance with a version of the invention is as follows. Incoming radiation in the spectral region to be detected is captured by either the pyroelectric layer 103/203/303 (where the pyroelectric layer is manufactured using an absorbing material) or the optional absorbing layer 105. The low absorption of the graphene enables the absorption characteristics of the absorbing layer 105 and/or the pyroelectric layer 103/203/303 to define the spectral response of the device. The radiation is dissipated within the device as heat, which subsequently causes a change in the surface polarization of the pyroelectric layer 103/203/303. The change in polarization leads to the generation of a pyroelectric current, the magnitude of which may be proportional to the intensity of incident radiation.

Figures 4A, 4B:
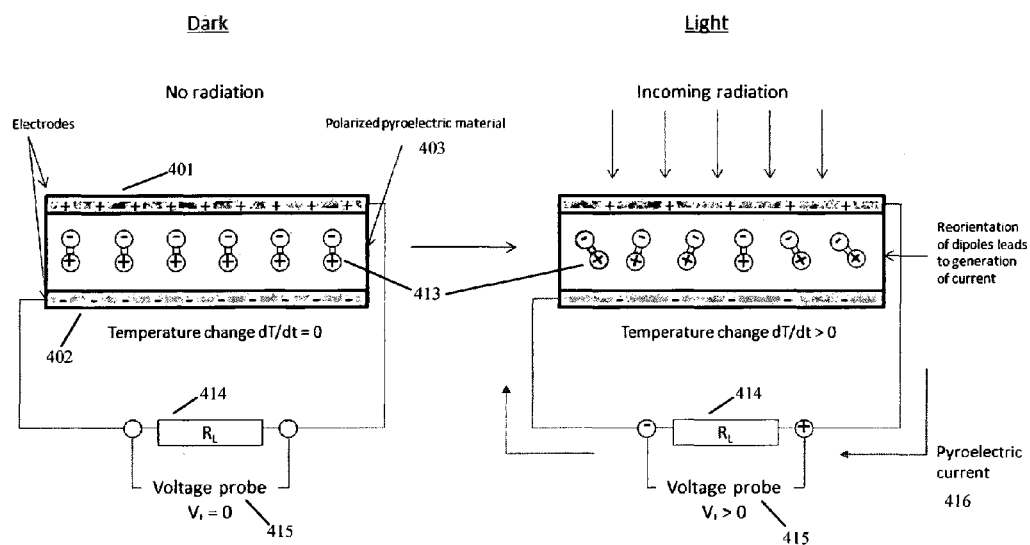

FIGS. 4A and 4B are schematic diagrams illustrating operation of a generic graphene/pyroelectric sensor, in accordance with a version of the invention, in which FIG. 4A illustrates operation with no radiation and FIG. 4B illustrates operation with incoming radiation. In FIG. 4A, the two conducting electrodes 401, 402, one or both of which may be graphene, are on either side of the pyroelectric material 403, in which dipoles 413 are in a polarized state due to the lack of incoming radiation. A load resistance $R_L$ 414 is between the two electrodes 401, 402. A bias voltage may or may not be applied between the two conducting electrodes 401, 402, until a constant "dark" current reading is obtained. FIGS. 4A and 4B depict the operation for a single graphene/pyroelectric sensing device with no bias voltage. In FIG. 4A, a voltage probe 415 measures a voltage $V_1$ of zero across the load resistance $R_L$ 414, and the temperature change over time, dT/dt, is zero. Upon illumination, as in FIG. 4B, the dipoles 413 undergo a reorientation, which leads to generation of a pyroelectric current 416, and the temperature change over time, dT/dt, is greater than zero. The reading of the voltage probe 415 is monitored and the intensity of radiation in the desired spectral region is calculated according to the magnitude of the observed differential with respect to the "dark" current value, i.e., the pyroelectric current 416. The voltage probe 415 reads a value $V_P$, greater than zero, which is proportional to the pyroelectric current 416 and the load resistance $R_L$ 414. In cases where no bias voltage is applied to the device, as in FIG. 4A, the "dark" current reading is assumed to be zero, and the intensity of impinging radiation is taken as the absolute value of the pyroelectric current 416. It will be appreciated that appropriate circuitry for the conversion of output readings to useable data can be provided.

Figures 5A, 5B:
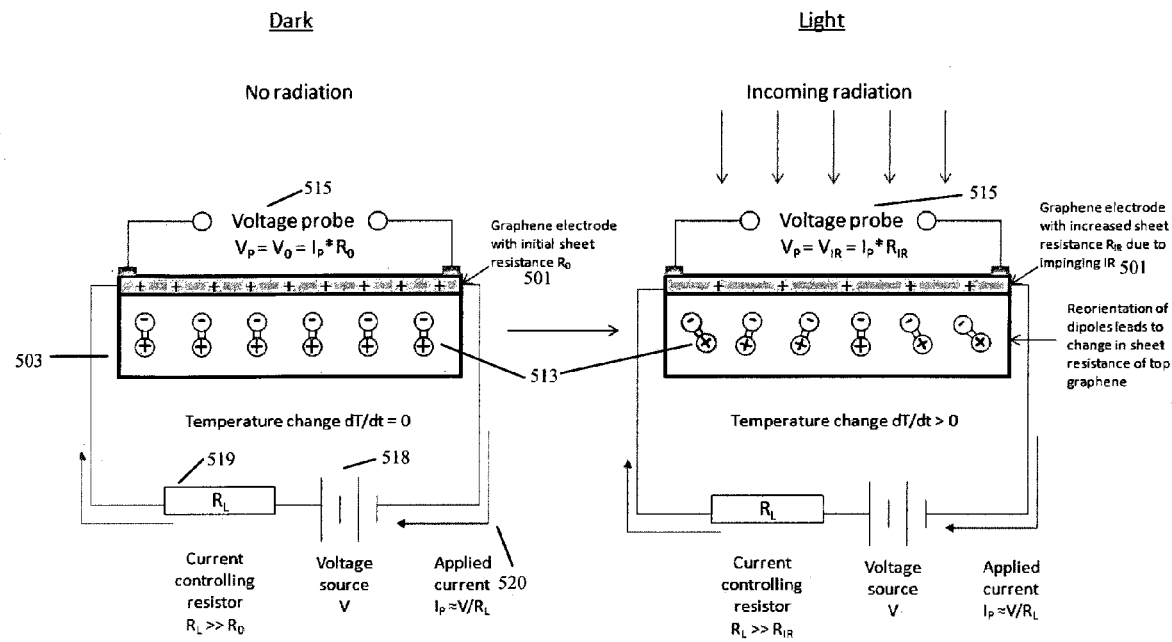

FIGS. 5A and 5B are schematic diagrams illustrating operation of a graphene/pyroelectric sensor functioning in sheet resistance mode, in accordance with a version of the invention, in which FIG. 5A illustrates operation with no radiation and FIG. 5B illustrates operation with incoming radiation. In the sheet resistance mode of operation, radiation is detected through a change in the sheet resistance of the low absorbing graphene sheet. In such operation, a constant current is passed from one side of the low absorbing graphene electrode to the other, and the voltage drop across the graphene sheet is measured. The absorption of radiation in the desired spectral region, and the subsequent realignment of dipoles in the pyroelectric layer, cause a reversible change in the doping of the graphene sheet, in turn affecting both the charge carrier density as well as the resistance. The resistance change, which is proportional to the amount of radiation absorbed, is measured using voltage probes. With reference to FIG. 5A, a graphene electrode 501 has an initial sheet resistance, $R_0$. A voltage source 518 with voltage V and a current controlling resistor 519, with resistance $R_L$ that is significantly larger than the initial sheet resistance $R_0$, are placed in series in a circuit between opposite sides of the graphene electrode 501, through which circuit the applied current 520, $I_P=V/R_L$, is passed. Dipoles 513 in pyroelectric material 503 are in a polarized state. A voltage probe 515 measures the voltage drop across the graphene sheet, which in FIG. 5A is proportional to the initial sheet resistance and applied current, as given by the relation $V_P=V_0=I_P*R_0$. The temperature change over time in FIG. 5A is zero, i.e., dT/dt=0. In FIG. 5B, there is incoming radiation, and the graphene electrode 501 has an increased sheet resistance $R_{IR}$ due to the impinging radiation. A reorientation of the dipoles 513 leads to a change in the sheet resistance of the graphene electrode 501. The temperature change over time, dT/dt, is greater than zero. The voltage probe 515 measures a voltage drop across the graphene sheet 501, which is proportional to the applied current and the increased sheet resistance $R_{IR}$, as given by the relation $V_P = V_{IR} = I_P * R_{IR}$. The voltage probe 515 reads a value proportional to the sheet resistance $R_{IR}$ of the graphene, which increases with the amount of absorbed radiation. The resistance change, which is proportional to the amount of radiation absorbed, is thereby measured using the voltage probe 515.

Note that measurement in sheet resistance mode, in accordance with a version of the invention, differs from bolometric detection techniques, as the sheet resistance mode relies on changes to the doping level (i.e., charge carrier density) of the graphene sheet due to fluctuations in the polarization of the pyroelectric layer, whereas bolometric effects probe changes in the conductivity of the material due to a change in temperature. The benefit of operating the device in sheet resistance measurement mode, in accordance with a version of the invention, is that thermal crosstalk is minimized due to the absence of the bottom electrode during standard operation of the sensor. In devices using conventional operation, the additional patterning required for contacting the bottom electrode reduces the effective spacing between pixels, in turn increasing the heat transfer between them. By contrast, in devices using sheet resistance operation in accordance with a version of the invention, no patterning is required, and the heat transfer between adjacent pixels is hence lowered. A bottom electrode may be required initially to polarize the pyroelectric layer, however this may later be removed using lift-off. Alternatively, the pyroelectric layer may be polarized by non-contact means.

In accordance with a version of the invention, the production process for graphene can include but not be limited to: chemical vapor deposition (CVD), micromechanical exfoliation, liquid-phase epitaxy, printing, reduction of graphene oxide, unzipping of carbon nanotubes, epitaxial growth on silicon carbide and others.

In accordance with a version of the invention, in the context of growth based processes for all forms of graphene other than interconnected mesh networks, the graphene may be directly grown on a substrate or can be transferred from the substrate that the graphene is originally grown on. The final substrate may be either flexible in nature such as the polymer polyethylene terephthalate (PET) or the ferroelectric polyvinylidene fluoride co-trifluoroethylene (PVDF-TrFE), or rigid such as glass. The deposition of the pyroelectric layer may be done using many methods including but not limited to: spin-coating, dip-coating, wire wound bar coating, blade coating, drop casting, Langmuir-Blodgett (LB) film growth or extrusion from melt. The deposition of the optional absorbing layer may be done using any of the methods described for the deposition of the pyroelectric. The top layer of graphene may be grown directly on the surface of the optional absorbing layer or the pyroelectric layer, or may be transferred from other substrates that the graphene has been grown or transferred on/to. The pyroelectric layer must be polarized prior to device use so as to ensure maximum sensitivity to incoming radiation.

In accordance with a version of the invention, in the context of growth processes for interconnected graphene networks, the graphene may be grown on and subsequently transferred from nickel or copper based foams using a Chemical Vapor Deposition (CVD) based process, or may be formed using a hotpress or other growth mechanism. The deposition of the pyroelectric layer may again be done using the nonexhaustive list of methods described above such as spin-coating, dip-coating, wire-wound bar coating, blade coating, drop casting, Langmuir-Blodgett (LB) film growth or direct melt based growth or others. The deposition of the optional absorbing layer may also be done using the same. The outer electrical contact may be formed by one of the methods described for the deposition of the pyroelectric layer and can be fashioned out of any conducting polymer that is non-reflective or low-reflective in the spectral region of interest, metal, metal alloy or ceramic.

In accordance with a version of the invention, the tunability of which wavelengths are detected can be achieved by selecting materials with appropriate optical absorption characteristics for either the pyroelectric active layer or the optional additional absorbing layers.

In another version of the invention, metallic networks such as nanowires may be used in either the top (exposed) electrode or the embedded rear electrode to supplement/enhance the properties of either layer.

Figure 6:
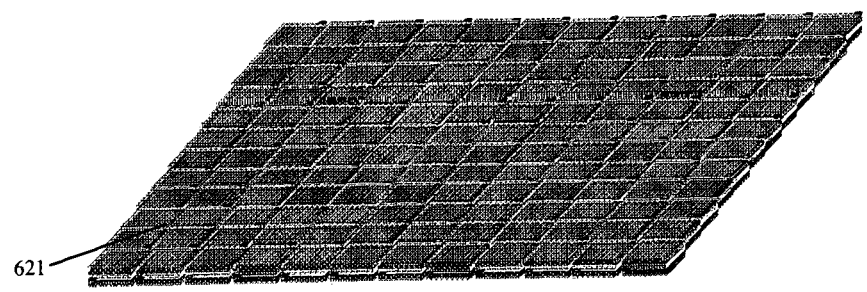
FIG. 6 is a schematic diagram of an array of pyroelectric sensors assembled into a pixelated sensing chip, in accordance with a version of the invention.

FIG. 6 is a schematic diagram of an array of pyroelectric sensors assembled into a pixelated sensing chip, in accordance with a version of the invention. Such an array may, for example, be used in instruments such as Fourier Transform Infrared Spectroscopy (FTIR) instruments or other IR sensing applications. In accordance with a version of the invention, arrays of graphene/pyroelectric sensors may be assembled together on a common support substrate 621, such as a chip, for pixelated sensing capabilities. FIG. 6 shows such an array of sensors as it would appear in a conventional grid structure. Devices may also be used alone and in isolation in applications such as motion sensors and other security/surveillance situations. It will be appreciated that external focusing mechanisms, multiplexing circuitry and other peripheral readout electronics and signal processing can be used with versions of the invention.

Sensor devices in accordance with a version of the invention provide several advantages over existing sensors, for example infrared sensors. Current photoconductive (MCT) infrared sensors are expensive and need to be operated at low temperatures in order to maintain a high sensitivity. Current bolometric infrared sensors suffer from poor sensitivity due to thermal crosstalk, and require the application of a constant bias current in order to measure a change in resistance. Current pyroelectric infrared sensors that use reflective metallic top electrodes suffer from poor sensitivity (5), which limits both the amount of infrared radiation allowed to pass through to the pyroelectric/IR absorbing layers as well as the pyroelectric current due to a reduction of the effective surface area by the metal contact. Often a trade-off is required via an electrode "patterning" process to achieve sufficient sensitivity. None of the current technologies permit devices to bend, stretch or flex, limiting mobile or dynamic applications of IR sensors.

By contrast, a pyroelectric sensor in accordance with a version of the invention may offer both a higher sensitivity and greater tunability over the wavelengths that are detected, than existing pyroelectric sensors due to the low absorbing graphene electrode. The detector may also be flexible depending on the materials used for the pyroelectric/absorbing/substrate layers. The detector may utilize less power than conventional bolometric infrared sensors as a bias current is not needed in one mode of operation, i.e., the device may generate its own power (pyroelectric current). The detector, operating in sheet resistance measurement mode, may offer improved sensitivity over bolometric and regular pyroelectric sensors due to the lack of thermal crosstalk between adjacent pixels in an array structure. The pyroelectric detector may also operate at room temperature, unlike photoconductive infrared sensors.

Sensor devices in accordance with a version of the invention may be used within a variety of industrial and research sectors including, but not necessarily limited to: defense, quality control and inspection, surveillance, biomedical imaging, as well as research and development. Some specific industrial applications include:

a) Integration into novel low cost spectrometer concepts such as the Multi-channel FTIR: The integration of the proposed low cost detector into spectrometric devices such as the MC-FTIR allows the manufacturing of very low cost spectrometer systems, reducing the system cost by two orders of magnitude. Such systems can be integrated in a plethora of applications ranging from gas sensing, quality assurance systems to rapid substance identification for homeland security and military.

b) Novel low cost flexible sensor systems: gas sensing and identification, thermal and infrared sensors integrated into textiles, personal electronics (watches, cellphones).

c) Defense applications: infrared sensors for night vision apparatus, onboard detectors for thermal tracking based missiles and weaponry as well as counteractive interception based systems for combustible propellant munition.

d) Quality control and inspection applications: heat monitoring of circuit boards and components, mechanical metrology, i.e., monitoring of thermal degradation and defects in structural components used in building façades/automotive/other temperature sensitive applications.

e) Biomedical and diagnosis applications: differentiation/detection of malignant tumor tissue, monitoring/detection of stress fractures, pandemic sensors.

f) Surveillance and security applications: human motion detectors, low visibility (i.e. firefighting) apparatus, volcano surveillance.

g) Research and development applications: photonic sensors in optical measurement devices.

REFERENCES (1) B de Goeij et al. "Microbolometer Spectrometer MIBS: Smaller and smarter", 5th ESA Round Table on Micro/Nano Technologies for Space, 3-5 Oct. 2005.

(2) "Technology Overview Microbolometer Detectors: Microbolometer focal plane arrays", <http://www.electrophysics.com/View/Viw_TechPrimer_UncooledTutorial.asp>

(3) R Balcerak and L Brown. "Mercury cadmium telluride material requirements for infrared systems", J. Vac. Sci. Technol. B. 10, 1353 (1992); doi: 10.1116/1.585868.

(4) "Answers to Questions on MCT's Advantages as an Infrared Imaging Material", DRS Technologies. 2010.

(5) C C Hsiao and S Y Yu, "Electrode layout of ZnO pyroelectric sensors", Journal of Mechanical Science and Technology. Vol 25, Issue 11, pp2835-2842.

(6) S-G Hur et al. "NiCr Alloy as both Absorption layer and top electrode onto $Pb(Zr_{0.3}Ti_{0.7})O_3$ thin films for Infrared Sensors", Integrated Ferroelectrics: An International Journal, 54:1, 741-746, DOI: 10.1080/714040724

Experimental

In the following, there is provided a description of experiments conducted in accordance with a version of the invention. It is noted that, while the experiment describes an infrared sensor, detectors taught herein may be used for any electromagnetic radiation, including, but not limited to, infrared radiation, teraherz radiation (far infrared), microwaves, millimeter waves, and other wavelengths of electromagnetic radiation, in accordance with versions of the invention. A separate listing of references is provided for the experimental section, below.

Experimental Introduction

In this study, we have exploited graphene's unique combination of IR-transparency and electrical conductivity to fabricate the first pyroelectric IR sensor with graphene electrodes. We find that the IR-transparency of graphene enables an order of magnitude improvement in operating frequency, paving the way for faster thermal imaging than has been possible with pyroelectrics. Moreover, this is achieved without any degradation in sensitivity, as compared to pyroelectric sensors using the same polyvinylidene fluoride (PVDF) active layer. Lastly, we demonstrate that our device structure is compatible with pixelation, and fabricate an imaging system capable of capturing several thermal images from a simulated scene. Our work thus highlights a new route for the utilization of graphene in IR sensing, with the use of organic pyroelectrics opening the door for novel curved and flexible thermal imaging applications.

Graphene has recently generated a great deal of interest as a bolometric detector of infrared radiation.[1-6] Graphene possesses a number of desirable properties for infrared sensing such as weak electron-phonon coupling and low electron heat capacity.[1] However, its inherently low absorption remains a drawback that cannot be readily overcome,[7] and has hindered its use in large-scale, uncooled detection systems.

Here, we have identified that this perceived shortcoming is instead a unique advantage, as graphene is the only electrical conductor with uniform, near-perfect optical and IR transparency.[7] In the IR regime, optically transparent conductors such as Indium Tin Oxide (ITO)[8] or silver nanowire (AgNW) films[9] become reflective, while carbon nanotube thin films are only capable of achieving a transparency of ~50% in wavelengths near 10 μm.[10] Thin metal films are similarly either reflective, or not as IR-transparent as graphene. Graphene, with a transparency of 97.7% in visible wavelengths and even higher transparency for doped graphene in the infrared,[11] is thus an intriguing and unique electrode material for use in pyroelectric infrared detection.

Pyroelectric detectors operate by converting radiation into heat, which subsequently elicits a current proportional to the intensity of incident light. Conventionally, these sensors comprise a pyroelectric material sandwiched between two electrodes. The top electrode serves both as an electrical conductor, as well as an absorption layer that conducts heat from incident radiation to the pyroelectric.[12-14] This mechanism hinders the response time of pyroelectric detectors,[15] and introduces heat transfer losses at the electrode-pyroelectric interface that worsen the detection.

In this study, we propose the replacement of the conventional top electrode with transparent graphene, as this should allow incident radiation to be absorbed directly by the pyroelectric. We expect this to result in faster detection, thus enabling greater spatial and time resolution in IR sensing applications such as biomedical imaging,[16] security & surveillance,[17] astronomy,[18] as well as materials characterization and gas sensing.[19] We conclude the study by demonstrating a pixelated array of our detectors for the imaging of thermal scenes.

Figure 7:
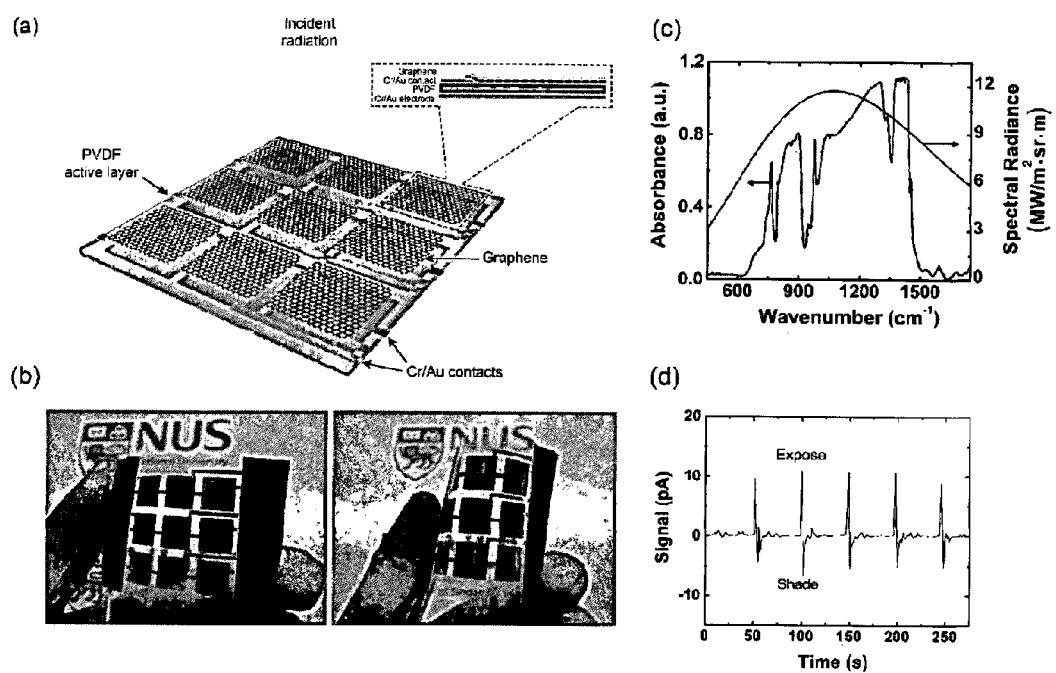
FIG. 7A is a schematic showing GPIR device structure and orientation to incoming radiation, in an experiment in accordance with a version of the invention. Cut-out inset shows layer-by-layer structure in cross section.
FIG. 7B shows photographs of a GPIR array detector illustrating its flexibility.
FIG. 7C is a graph showing an FTIR absorption spectrum of PVDF active layer in red overlaid with the emission of a blackbody at 310K (i.e. human being) in green.
FIG. 7D is a graph showing pyroelectric response of GPIR sensor when exposed to, and shaded from, thermal activity.

Corona poled, 40 μm thick polyvinylidene fluoride (PVDF) films were used as the active pyroelectric layer due to its strong absorption of IR,[20,21] flexibility, as well as its demonstrated compatibility with graphene.[22-24] The fabricated detector array consists of nine pixels, with the top electrode being graphene and the bottom electrode a Cr/Au thin film. A schematic of the device structure, as well as pictures of the detector and its flexibility are shown in FIG. 7A and FIG. 7B, respectively. The simplicity of device structure and roll-to-roll compatible fabrication techniques represent a considerable advantage for any future applications making use of such detectors.[25] FIG. 7C depicts the infrared absorbance spectrum of the PVDF film and the simulated IR emission of a 310K blackbody in vacuum. Remarkably, the peak spectral radiance of the blackbody coincides with the absorption bands of the PVDF, suggesting that our detector would be well-suited for the thermal imaging of warm bodies.

The pyroelectric response of the Graphene-Pyroelectric Infrared (GPIR) sensors was validated by iteratively exposing them to thermal activity (FIG. 7D). The positive peaks correspond to the increased oscillation of the dipoles in the PVDF due to the absorption of thermal energy.[23] This oscillation causes the net surface polarization at the graphene electrode to decrease, resulting in a positive pyroelectric current. Similarly, shading the device causes cooling of polarized regions in the PVDF, which leads to a decrease in dipole oscillation. This in turn enhances the surface polarization, and is recorded as a negative peak in the waveform. In both cases, the pyroelectric current is given by:

$$I_{pyro} = p \cdot A \cdot dT/dt \qquad \text{Equation (1)}$$

Where p is the pyroelectric coefficient of the PVDF, A is the area of the device and dT/dt is the time-varying temperature differential due to absorbed radiation.

Next, the performance of the GPIR sensors was evaluated in terms of sensitivity and frequency response. The sensitivity of sensors was quantified by the Specific Detectivity (D*), which normalizes the Noise Equivalent Power of the detector by the device area and noise frequency bandwidth. The frequency response of the GPIR sensors was quantified by the upper 3 dB cutoff frequency, $f_{3\ dB}$, below which the device signal remains within 70.7% of its maximum.

Pyroelectric signal measurements were obtained by illuminating GPIR sensors with chopped radiation from a cavity blackbody source. The signal of the detector for various blackbody temperatures as a function of chopping frequency is plotted in FIG. 8A. The highest signal measured was 52.4 pA at a blackbody temperature of 1200° C. and a chopping frequency of 33 Hz. Signal was found to decay exponentially with frequency, with the $f_{3\ dB}$ calculated to be 681 Hz. This frequency is considerably higher than conventional PVDF sensors, which typically exhibit a decay below 100 Hz.[26-28] The $f_{3\ dB}$ frequency is also higher than that in recent works demonstrating improved response times ($f_{3\ dB}$~300 Hz) in pyroelectric sensors with patterned top electrodes,[29,30] suggesting that the IR-transparency of graphene is indeed having an effect on detector performance.

We then verified that the high $f_{3\ dB}$ frequency does not arise at the expense of detector sensitivity. Signal data was used in conjunction with noise measurements to calculate the signal-to-noise ratio (SNR) and specific detectivity, D*. SNR as a function of the chopping frequency and the blackbody temperature is plotted in FIG. 8B. SNR was observed to peak to a value of 75 dB at 1200° C. and 183 Hz. The highest SNR does not coincide with the point of highest signal due to the higher contribution from 1/f noise at frequencies below 180 Hz. At frequencies above 180 Hz the contribution from 1/f noise diminishes but the decay in signal leads to a drop in SNR.

Figure 8:
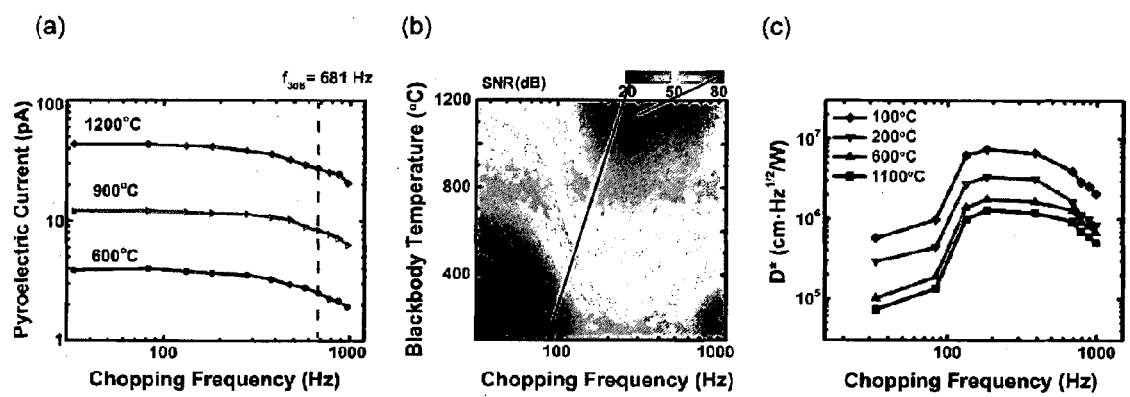
FIG. 8A is a graph of pyroelectric signal as a function of chopping frequency for various blackbody temperatures, in an experiment in accordance with a version of the invention. Vertical line indicates the upper cutoff frequency $f_{3\,db}$.
FIG. 8B is a graph of signal-to-noise ratio of GPIR sensors as a function of chopping frequency and blackbody temperature.
FIG. 8C is a graph of D* of GPIR sensors as a function of chopping frequency at various blackbody temperatures.

Specific Detectivity D* of the GPIR sensors is presented as a function of chopping frequency for various blackbody temperatures in FIG. 8C. The maximum was calculated to be 7.42×10$^6$ cm·Hz$^{1/2}$/W, which occurs at 100° C. and a chopping frequency of 183 Hz. This sensitivity is comparable to that of other PVDF detectors, which report D* between 10$^6$ and 10$^7$ cm·Hz$^{1/2}$/W.[26-28] Overall, D* was observed to peak between 160 Hz and 200 Hz; a frequency range that is also higher than for other PVDF pyroelectric sensors, which have reported peak sensitivities between 60 Hz and 100 Hz.[26-28] As with device signal, D* was also observed to remain consistent until a $f_{3\ dB}$ of ~700 Hz. These comparisons determine that GPIR sensors allow faster thermal imaging than previously reported PVDF-based pyroelectric detectors, without any degradation in sensitivity.

Figure 9:
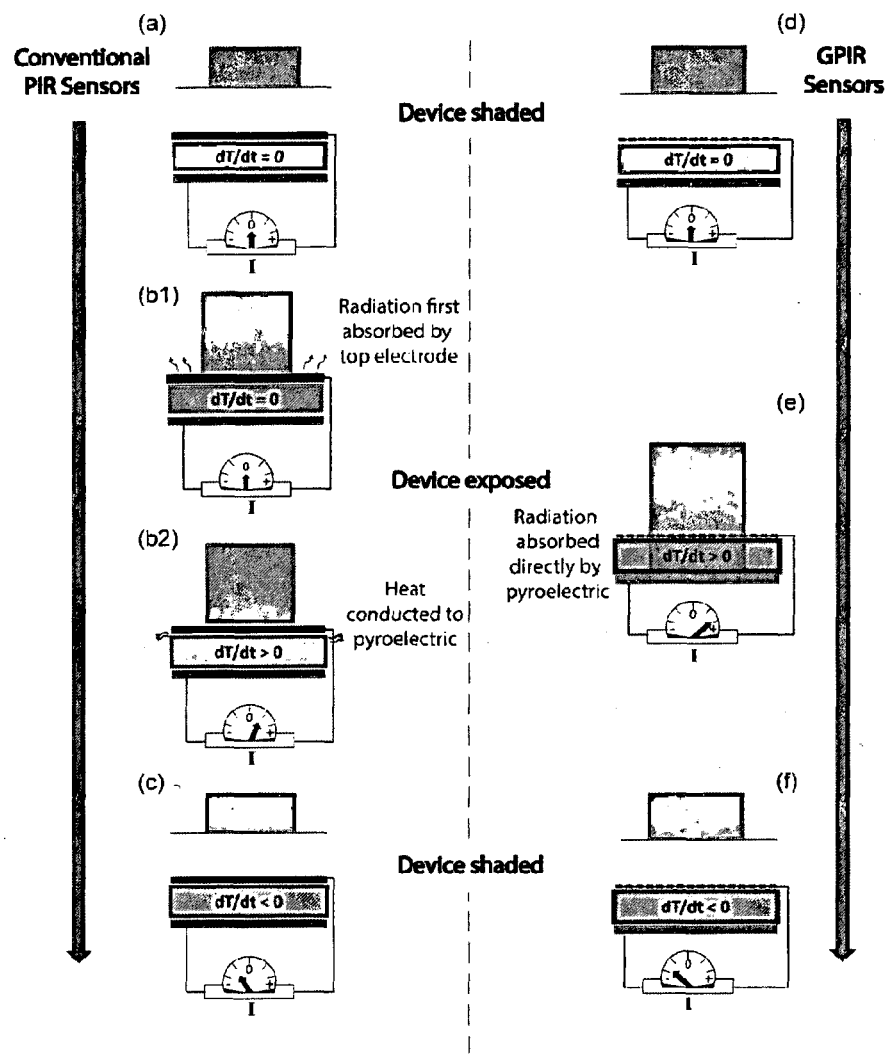
FIGS. 9A to 9C are schematic diagrams illustrating operation of a conventional PIR sensor, in accordance with the prior art.
FIGS. 9D to 9F are schematic diagrams illustrating operation of a GPIR sensor in accordance with a version of the invention.

We propose that the improved operating frequency of GPIR sensors compared to conventional pyroelectric (PIR) sensors is directly due to graphene's unique combination of IR-transparency and electrical conductivity. We explain this by contrasting their operation principles (FIG. 9). In a PIR detector, incident radiation is absorbed by the top electrode, typically Ni—Cr or Au-black, which then converts it into heat (FIG. 9b1). The heat needs to be subsequently conducted to the pyroelectric layer for detection (FIG. 9b2); a process that relies strongly on the thermal resistance of the interface between the top electrode and the pyroelectric layer.[31] Doing so not only results in heat losses to the environment and external circuitry, but also introduces a delay between the radiation being absorbed and an electrical signal being generated. It has been demonstrated that patterning the top electrode enhances response time by allowing a portion of incident radiation to be directly absorbed by the pyroelectric. However, this comes at the expense of effective detector area since those regions are no longer electrically connected.[30] A trade-off thus arises between having sufficient metalized area for signal capture, and having sufficient exposed pyroelectric surface for improved frequency response.

In the case of GPIR sensors, this trade-off is made irrelevant, as the transparency of the top graphene electrode allows radiation to be directly absorbed by the entire pyroelectric layer. This is achieved without intermediate transfer losses and also without any delay between the radiation being absorbed and the heat being conducted (FIG. 9E). Furthermore, the pyroelectric signal is collected over the full electrode area because of the graphene coverage of the pyroelectric, as compared to patterned top electrodes. As such, GPIR sensors combine the beneficial aspects of both fully-covered (complete area utilization) and partially-covered (direct absorption) electrode sensor structures. This translates into faster heat-to-signal conversion without degradation in signal, which enables sustained device performance at higher frequencies. While the work presented here validates this hypothesis for PVDF-based detectors, we expect the result to hold for other pyroelectric active layers as well. Furthermore, we believe that the potential of graphene is not limited to only pyroelectric detection, and propose that intriguing results could be obtained with the use of optically- and IR-transparent graphene electrodes in a wider range of photodetector configurations.

Figure 10:
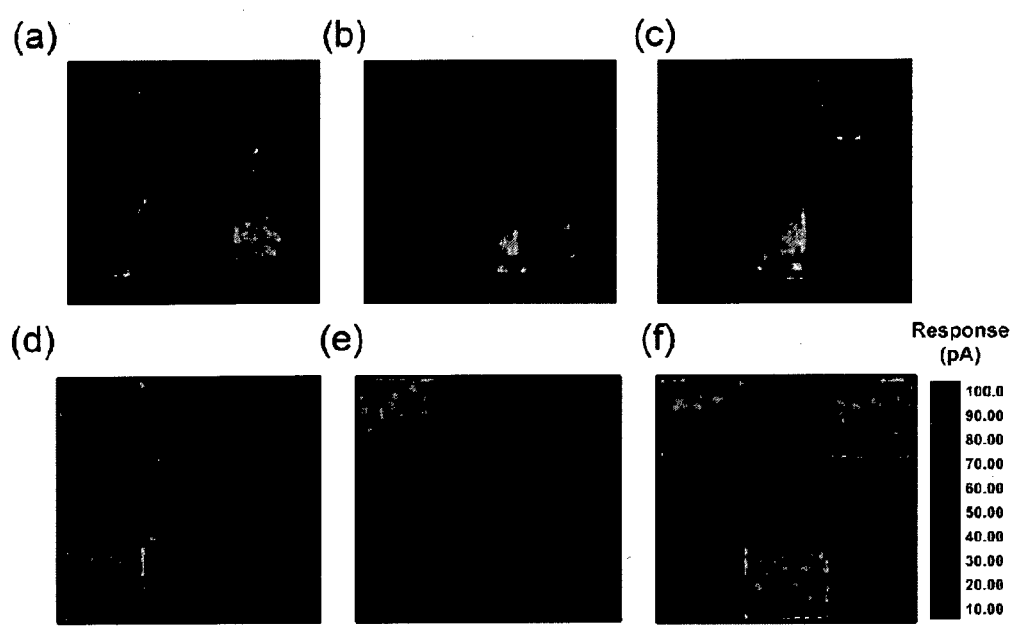
FIGS. 10A to 10C are photographs of selectively shaded portions of incoming radiation at 1200° C. to form letters on the surface of the GPIR detector, in an experiment in accordance with a version of the invention.
FIGS. 10D to 10F are photographs showing response of pixels in the GPIR detector array, taken as the difference in light and dark currents, to incident radiation.

Lastly, we constructed a proof-of-concept array of GPIR sensor to demonstrate that our structure was compatible with pixelation, and used it to image a thermal scene (FIG. 10). First, dark current measurements were conducted at each of the 9 pixels to establish the baseline signal. The array was then selectively exposed to blackbody radiation at 1200° C. and the current was again recorded. The response of the pixels was calculated as the difference between light and dark currents. This procedure allowed us to quantify the amount of leak current in shaded pixels due to thermal crosstalk. FIGS. 10A to 10C illustrate the illumination of the letters H, O and T on the pixels, while FIGS. 10D to 10F depict their response. Illuminated pixels were found to generate an average signal of 82 pA with a standard deviation off ±3 pA. The average leak current for all shaded pixels, i.e. the center pixel in letter 'O', was observed to be 11% of illuminated device response. These results show the robustness of our methods for the fabrication of large area array detectors.

To summarize, in this study we have been the first to recognize and exploit graphene's unique combination of IR-transparency and electrical conductivity for pyroelectric infrared detection. We find that replacing the conventional electrode with graphene enables considerably faster detector operation, with our GPIR sensor capable of maintaining its sensitivity to an upper cutoff frequency $f_{3\ dB}$ ~680 Hz. Moreover, high frequency operation does not come at the expense of sensitivity; our sensor, even at 680 Hz, maintained a D* comparable to the peak detectivities achieved by PVDF-based detectors in literature. We propose that faster operation is due to direct absorption of radiation within the entire surface area of the pyroelectric, in contrast to detectors using absorbing or patterned electrode structures. Lastly, we demonstrate that our detector is capable of accurate thermal imaging, with minimal thermal crosstalk observed between shaded and illuminated pixels. Future work could seek to further investigate this effect by integrating transparent graphene electrodes with other pyroelectric active layers, and indeed, into other classes of photodetectors as well.

Experimental Section

CVD-grown graphene on copper foil was cut into the appropriate size and transferred with a polymer mediated process.[32] A 400 nm thick PVDF-TrFE:DMF transfer layer was spin-coated on CVD graphene followed by an annealing step. Backside graphene was etched by oxygen plasma and then the copper foil was etched in ammonium persulfate solution. The graphene/PVDF-TrFE stack was then rinsed in DI water.

A pre-poled, 40 μm PVDF film was cut into the appropriate size. 5 nm Chromium and 50 nm Gold were selectively deposited by thermal evaporation to one side of the PVDF film to form the rear electrode. Another mask was used to selectively deposit 5 nm Chromium and 50 nm Gold on the other side of the PVDF film, to form gold the contacts for the top graphene electrodes. The PVDF film was used as a substrate to scoop the floating graphene/PVDF-TrFE stack. Graphene was patterned and isolated into 1 cm×1 cm pixels by etching with oxygen plasma.

The response of the GPIR sensors was evaluated by illumination with a collimated IR beam (collimation angle of 0.2 mrad) emanating from a cavity blackbody source at temperatures from 100° C. to 1200° C., in 100° C. increments. A mechanical chopper was placed near to the source point to generate signal pulses at frequencies ranging from 33 Hz to 1 kHz. Device signals were captured in ambient conditions at room temperature using a lock-in amplifier phase-locked to the chopper frequency. The use of lock-in amplification allowed us to reduce known coupling effects from the piezoresponse of the device due to acoustic noise.[33] Noise measurements were taken with a blocked beam at varying reference frequencies and blackbody temperatures, in order to account for any residual piezo-effects due to acoustic noise.

IR absorption of devices was characterized using a FTIR Spectrometer in a nitrogen atmosphere at room temperature.

EXPERIMENTAL REFERENCES

1. Yan, J., M. H. Kim, J. A. Elle, A. B. Sushkov, G. S. Jenkins, H. M. Milchberg, M. S. Fuhrer, H. D. Drew, *Dual-gated bilayer graphene hot-electron bolometer.* Nat Nano, 2012. 7(7): p. 472-478.
2. Vicarelli, L., M. S. Vitiello, D. Coquillat, A. Lombardo, A. C. Ferrari, W. Knap, M. Polini, V. Pellegrini, A. Tredicucci, *Graphene field-effect transistors as room-temperature terahertz detectors.* Nat Mater, 2012. 11(10): p. 865-871.
3. Tassin, P., T. Koschny, C. M. Soukoulis, *Graphene for Terahertz Applications.* Science, 2013. 341(6146): p. 620-621.
4. Han, Q., T. Gao, R. Zhang, Y. Chen, J. Chen, G. Liu, Y. Zhang, Z. Liu, X. Wu, D. Yu, *Highly sensitive hot electron bolometer based on disordered graphene.* Sci. Rep., 2013. 3.
5. Low, T., P. Avouris, Graphene Plasmonics for Terahertz to Mid-Infrared Applications. ACS Nano, 2014. 8(2): p. 1086-1101.
6. Liu, C.-H., Y.-C. Chang, T. B. Norris, Z. Zhong, *Graphene photodetectors with ultra-broadband and high responsivity at room temperature.* Nat Nano, 2014. advance online publication.
7. Nair, R. R., P. Blake, A. N. Grigorenko, K. S. Novoselov, T. J. Booth, T. Stauber, N. M. R. Peres, A. K. Geim, *Fine Structure Constant Defines Visual Transparency of Graphene.* Science, 2008. 320(5881): p. 1308.
8. Granqvist, C. G., A. Hultåker, *Transparent and conducting ITO films: new developments and applications.* Thin Solid Films, 2002. 411(1): p. 1-5.
9. Hu, L., D. S. Hecht, G. Gruner, *Infrared transparent carbon nanotube thin films.* Applied Physics Letters, 2009. 94(8): p. 081103-081103-3.
10. Wu, Z., Z. Chen, X. Du, J. M. Logan, J. Sippel, M. Nikolou, K. Kamaras, J. R. Reynolds, D. B. Tanner, A. F. Hebard, A. G. Rinzler, *Transparent, Conductive Carbon Nanotube Films.* Science, 2004. 305(5688): p. 1273-1276.
11. Li, Z. Q., E. A. Henriksen, Z. Jiang, Z. Hao, M. C. Martin, P. Kim, H. L. Stormer, D. N. Basov, *Dirac charge dynamics in graphene by infrared spectroscopy.* Nat Phys, 2008. 4(7): p. 532-535.
12. Kwon, S. Y., Effect of P(VDF/TrFE) Film Thickness on the Characteristics of Pyroelectric Passive Infrared Ray Sensor for Human Body Detection. Journal of Sensor Science and Technology, 2011. 20(2): p. 3.
13. Takayama, R., Y. Tomita, K. Iijima, I. Ueda, Preparation and characteristics of pyroelectric infrared sensors made of c-axis oriented La-modified PbTiO3 thin films. Journal of Applied Physics, 1987. 61(1): p. 411-415.
14. Hur, S.-G., N.-J. Seong, K.-J. Choi, S.-G. Yoon, NiCr Alloy As Both Absorption Layer and Top Electrode onto Pb(Zr0.3Ti0.7)O3 Thin Films for Infrared Sensors. Integrated Ferroelectrics, 2003. 54(1): p. 741-746.
15. Rogalski, A., *Infrared detectors: an overview.* Infrared Physics & Technology, 2002. 43(3-5): p. 187-210.
16. Barone, P. W., S. Baik, D. A. Heller, M. S. Strano, *Near-infrared optical sensors based on single-walled carbon nanotubes.* Nat Mater, 2005. 4(1): p. 86-92.
17. Kallhammer, J.-E., *Imaging: The road ahead for car night-vision.* Nat Photon, 2006. sample(sample): p. 12-13.

18. Deming, D., S. Seager, L. J. Richardson, J. Harrington, *Infrared radiation from an extrasolar planet.* Nature, 2005. 434(7034): p. 740-743.

19. Tonouchi, M., *Cutting-edge terahertz technology.* Nat Photon, 2007. 1(2): p. 97-105.

20. Levesque, M., M. Cote, S. Lelievre, P. Galarneau. *P(VDF-TrFE) infrared detectors and array.* 1994.

21. Whatmore, R. W., *Pyroelectric ceramics and devices for thermal infra-red detection and imaging.* Ferroelectrics, 1991. 118(1): p. 241-259.

22. Bae, S. H., O. Kahya, B. K. Sharma, J. Kwon, H. J. Cho, B. Ozyilmaz, J. H. Aim, *Graphene-P(VDF-TrFE) multilayer film for flexible applications.* ACS Nano, 2013. 7(4): p. 3130-8.

23. Lee, J.-H., K. Y. Lee, M. K. Gupta, T. Y. Kim, D.-Y. Lee, J. Oh, C. Ryu, W. J. Yoo, C.-Y. Kang, S.-J. Yoon, J.-B. Yoo, S.-W. Kim, *Highly Stretchable Piezoelectric-Pyroelectric Hybrid Nanogenerator.* Advanced Materials, 2014. 26(5): p. 765-769.

24. Ni, G.-X., Y. Zheng, S. Bae, C. Y. Tan, O. Kahya, J. Wu, B. H. Hong, K. Yao, B. Özyilmaz, *Graphene-Ferroelectric Hybrid Structure for Flexible Transparent Electrodes.* ACS Nano, 2012. 6(5): p. 3935-3942.

25. Bae, S., H. Kim, Y. Lee, X. Xu, J.-S. Park, Y. Zheng, J. Balakrishnan, T. Lei, H. Ri Kim, Y. I. Song, Y.-J. Kim, K. S. Kim, B. Ozyilmaz, J.-H. Ahn, B. H. Hong, S. Iijima, *Roll-to-roll production of 30-inch graphene films for transparent electrodes.* Nat Nano, 2010. 5(8): p. 574-578.

26. Dong Hoon, C., Y. Yung Sup, *Pyroelectric Properties of the B-Polyvilnylidene Fluoride (PVDF) Thin Film Prepared by Vacuum Deposition with Electric Field Application.* Japanese Journal of Applied Physics, 2002. 41(11S): p. 7234.

27. Fujitsuka, N., J. Sakata, Y. Miyachi, K. Mizuno, K. Ohtsuka, Y. Taga, O. Tabata. *Monolithic pyroelectric infrared image sensor using PVDF thin film.* in Solid State Sensors and Actuators, 1997. TRANSDUCERS '97 Chicago., 1997 International Conference on. 1997.

28. Setiadi, D., H. Weller, T. D. Binnie, *A pyroelectric polymer infrared sensor array with a charge amplifier readout.* Sensors and Actuators A: Physical, 1999. 76(1-3): p. 145-151.

29. Wei, C. S., Y. Y. Lin, Y. C. Hu, C. W. Wu, C. K. Shih, C. T. Huang, S. H. Chang, *Partial-electroded ZnO pyroelectric sensors for responsivity improvement.* Sensors and Actuators A: Physical, 2006. 128(1): p. 18-24.

30. Hsiao, C.-C., S.-Y. Yu, *Electrode layout of ZnO pyroelectric sensors.* Journal of Mechanical Science and Technology, 2011. 25(11): p. 2835-2842.

31. Bravina, S. L., N. V. Morozovsky, G. I. Dovbeshko, E. D. Obraztsova *Thermal Characterization of Absorbing Coatings for Thermal Detectors of Radiation by Photopyroelectric Method.* eprint arXiv:cond-mat/0603529, 2006. 3529.

32. Li, X., W. Cai, J. An, S. Kim, J. Nah, D. Yang, R. Piner, A. Velamakanni, I. Jung, E. Tutuc, S. K. Banerjee, L. Colombo, R. S. Ruoff, *Large-Area Synthesis of High-Quality and Uniform Graphene Films on Copper Foils.* Science, 2009.324(5932): p. 1312-1314.

33. Emmerich, R., S. Bauer, B. Ploss. *Pyroelectric effects in PVDF and P(VDF-TrFE).* in Electrets, 1991. (ISE 7) Proceedings., 7th International Symposium on (Cat. No.91CH3029-6). 1991.

34. Setiadi, D., P. M. Sarro, P. P. L. Regtien, *A 3×1 integrated pyroelectric sensor based on VDF/TrFE copolymer.* Sensors and Actuators A: Physical, 1996. 52(1-3): p. 103-109.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A pyroelectric detector configured to measure intensity of at least one wavelength of electromagnetic radiation impinging on the pyroelectric detector, the detector comprising:
    at least one pyroelectric active layer configured to undergo a reorientation of dipoles in response to the at least one wavelength of the electromagnetic radiation; and
    at least one graphene electrode transparent to the at least one wavelength of the electromagnetic radiation,
    the at least one pyroelectric active layer configured to directly absorb the at least one wavelength of the electromagnetic radiation, the at least one wavelength having been transmitted through the at least one graphene electrode transparent to the at least one wavelength of the electromagnetic radiation.

2. The pyroelectric detector of claim 1, further comprising:
    at least one back substrate.

3. The pyroelectric detector of claim 2, wherein the at least one back substrate comprises a transparent and flexible material.

4. The pyroelectric detector of claim 3, wherein the at least one back substrate comprises polyethylene terephthalate.

5. The pyroelectric detector of claim 2, further comprising a conductive coating on the at least one back substrate.

6. The pyroelectric detector of claim 5, wherein the conductive coating comprises a conductive coating transparent to the at least one wavelength of the electromagnetic radiation.

7. The pyroelectric detector of claim 5, wherein the conductive coating comprises a conductive coating that is reflective of the at least one wavelength of the electromagnetic radiation.

8. The pyroelectric detector of claim 1, wherein the at least one graphene electrode comprises at least one of: single layer graphene, bilayer graphene, multilayer graphene, reduced graphene oxide, graphene platelets, and an interconnected graphene network.

9. The pyroelectric detector of claim 8, wherein the at least one graphene electrode comprises an interconnected graphene network, and wherein the interconnected graphene network comprises at least one of: (i) a graphene foam and (ii) a graphene array.

10. The pyroelectric detector of claim 1, wherein the at least one pyroelectric layer comprises at least one of: (i) polyvinylidene fluoride and (ii) a copolymer of polyvinylidene fluoride.

11. The pyroelectric detector of claim 1, wherein the at least one pyroelectric layer comprises lead zirconium titanate.

12. The pyroelectric detector of claim 1, wherein the at least one graphene electrode comprises a graphene foam, wherein the at least one pyroelectric active layer comprises a surrounding coating on at least a portion of the graphene foam, and wherein the detector comprises an outer conducting layer surrounding the at least a portion of the at least one pyroelectric active layer.

13. The pyroelectric detector of claim 1, wherein the at least one graphene electrode is configured to undergo a change in sheet resistance in response to the at least one wavelength of the electromagnetic radiation.

14. The pyroelectric detector of claim 13, further comprising:
a voltage source configured to pass a current across a surface of the at least one graphene electrode; and
a voltage probe configured to measure a voltage across the surface of the at least one graphene electrode, the voltage across the surface being proportional to the changed sheet resistance of the at least one graphene electrode.

15. The pyroelectric detector of claim 13, wherein the detector comprises only one electrode.

16. The pyroelectric detector of claim 13, wherein the detector comprises:
a substrate transparent to the at least one wavelength of the electromagnetic radiation, the substrate configured to receive the electromagnetic radiation; and
at least one back substrate.

17. The pyroelectric detector of claim 1, wherein the detector is mechanically flexible.

18. The pyroelectric detector of claim 1, wherein the detector comprises only one electrode, the electrode being only one graphene electrode,
the only one graphene electrode being configured to undergo a change in sheet resistance in response to the at least one wavelength of the electromagnetic radiation,
the pyroelectric detector further comprising:
a voltage source configured to pass a current across a surface of the at least one graphene electrode;
a voltage probe configured to measure a voltage across the surface of the at least one graphene electrode, the voltage across the surface being proportional to the changed sheet resistance of the at least one graphene electrode.

19. The pyroelectric detector of claim 1, wherein absorption characteristics of the at least one pyroelectric active layer define a spectral response of the pyroelectric detector.

20. The pyroelectric detector of claim 1, wherein the at least one wavelength comprises an infrared wavelength.

* * * * *